United States Patent
Duluk, Jr. et al.

(10) Patent No.: US 8,766,988 B2
(45) Date of Patent: Jul. 1, 2014

(54) PROVIDING PIPELINE STATE THROUGH CONSTANT BUFFERS

(75) Inventors: Jerome F. Duluk, Jr., Palo Alto, CA (US); Jesse David Hall, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 914 days.

(21) Appl. No.: 12/899,454

(22) Filed: Oct. 6, 2010

(65) Prior Publication Data

US 2011/0087864 A1   Apr. 14, 2011

Related U.S. Application Data

(60) Provisional application No. 61/250,358, filed on Oct. 9, 2009.

(51) Int. Cl.
| G06T 1/20 | (2006.01) |
| G06T 1/00 | (2006.01) |
| G06F 15/00 | (2006.01) |

(52) U.S. Cl.
USPC .................................... 345/506; 345/501

(58) Field of Classification Search
CPC ......... G06T 1/00; G06T 1/0092; G06T 15/00; G06T 1/20; G06T 1/60
USPC .................. 345/501, 506, 426, 502, 522, 530
See application file for complete search history.

(56) References Cited

U.S. PATENT DOCUMENTS

| 7,877,565 B1 * | 1/2011 | Allen et al. .................... 711/165 |
| 2007/0252843 A1 * | 11/2007 | Yu et al. .......................... 345/557 |
| 2008/0001952 A1 * | 1/2008 | Srinivasan et al. ............. 345/502 |
| 2008/0001956 A1 * | 1/2008 | Markovic et al. ............. 345/522 |

* cited by examiner

*Primary Examiner* — Jacinta M Crawford
(74) *Attorney, Agent, or Firm* — Patterson & Sheridan, LLP

(57) ABSTRACT

One embodiment of the present invention sets forth a technique for providing state information to one or more shader engines within a processing pipeline. State information received from an application accessing the processing pipeline is stored in constant buffer memory accessible to each of the shader engines. The shader engines can then retrieve the state information during execution.

24 Claims, 19 Drawing Sheets

PROVIDING PIPELINE STATE THROUGH CONSTANT BUFFERS

CROSS-REFERENCE TO RELATED APPLICATIONS

This application claims benefit of United States provisional patent application entitled "Providing Pipeline State through Constant Buffers" filed on Oct. 9, 2009 and having a Ser. No. 61/250,358.

BACKGROUND OF THE INVENTION

1. Field of the Invention

The present invention relates generally to the field of parallel processing and, more specifically, to providing pipeline state through constant buffers.

2. Description of the Related Art

In a typical processing environment, and especially in a graphics processing environment, there is a large amount of state information that is transmitted by an application to facilitate the processing of input data. It is particularly advantageous to provide such state information to the different processing engines within the processing environment. For example, it would be advantageous to provide blend state information to a pixel shading engine in a graphics processing pipeline.

One technique for providing state information to the different processing engines and units within the processing environment involves transmitting bundles of state information to each of the engines via hardware. This technique, however, is extremely expensive in terms of die space requirements on the chip and, therefore, an undesirable mechanism for providing pipeline state to the engines.

As the foregoing illustrates, what is needed in the art is a mechanism for efficiently providing pipeline state to engines of a processing environment.

SUMMARY OF THE INVENTION

One embodiment of the present invention is a method for providing state information to one or more shader engines within a processing pipeline. The method includes the steps of receiving state information from an application, and, based on the state information, updating pipeline state stored in a constant buffer coupled to each of the one or more shader engines, wherein the pipeline state stored in the constant buffer is accessible by each of the one or more shader engines.

Advantageously, the technique described herein allows shader engines executing within the graphics pipeline to access state information that was previously unavailable to shader engines. Further, the mechanism described for accessing the state information via the constant buffers does not require any hardware modifications or computationally intensive processing

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
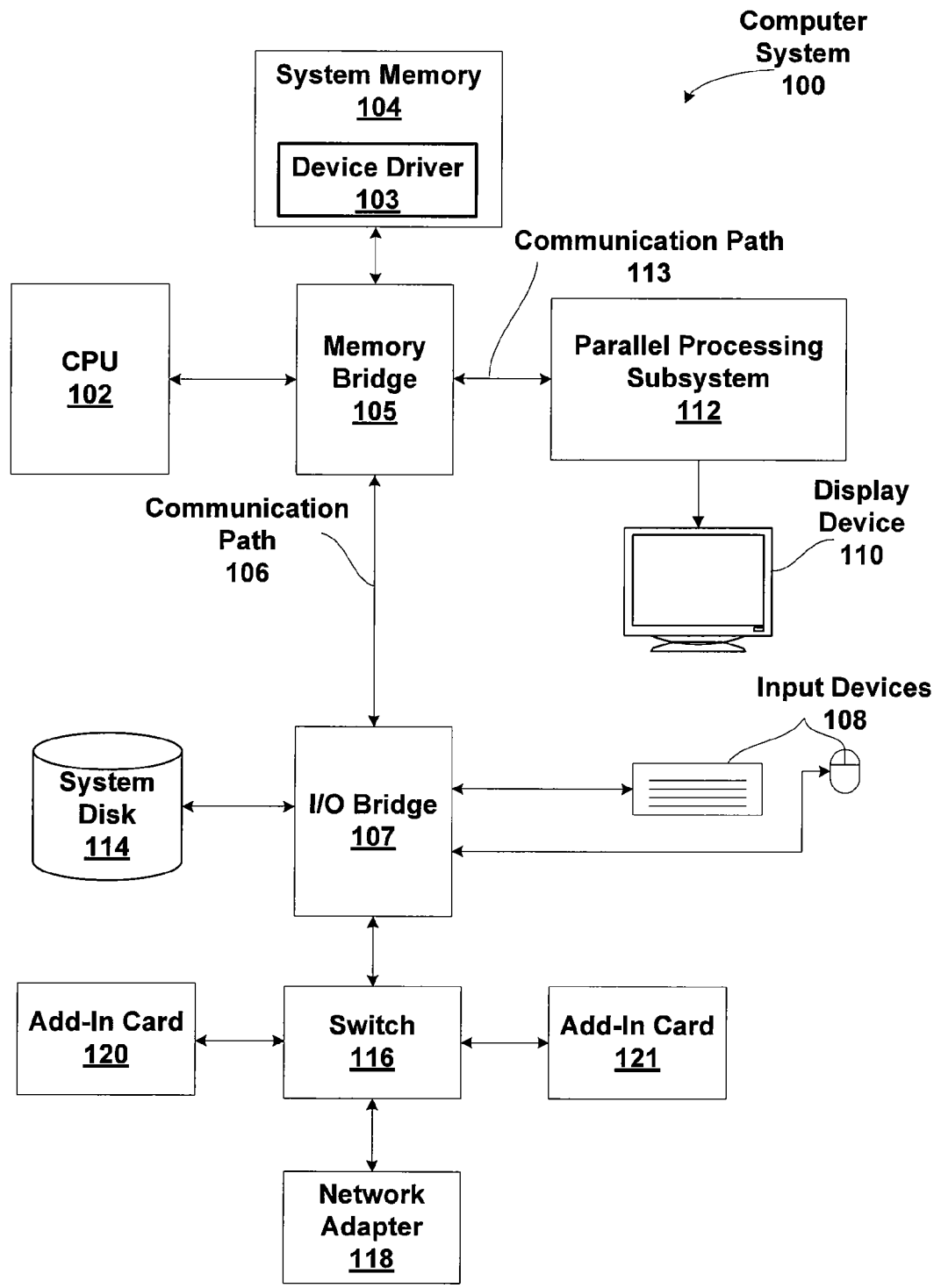
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
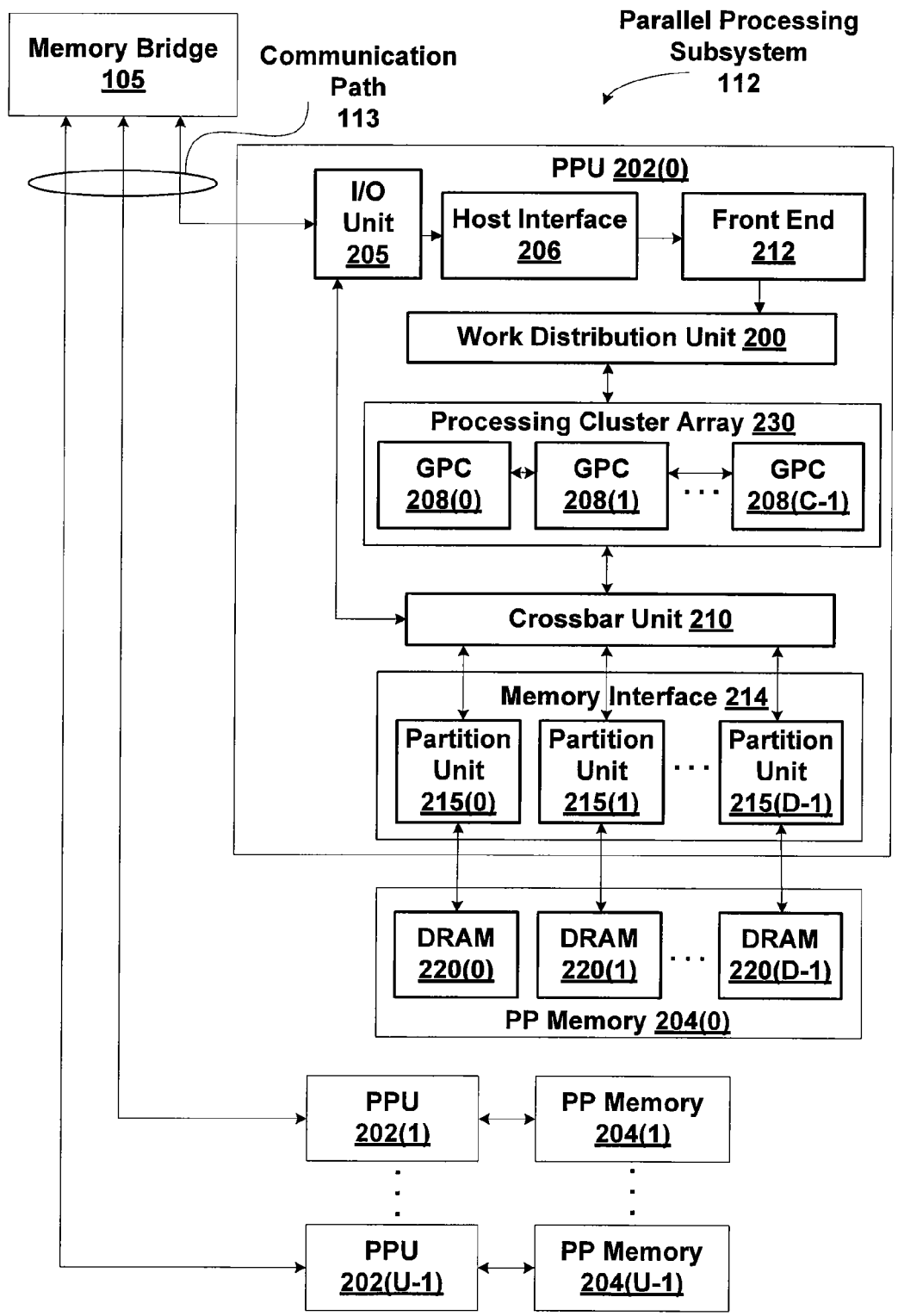
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
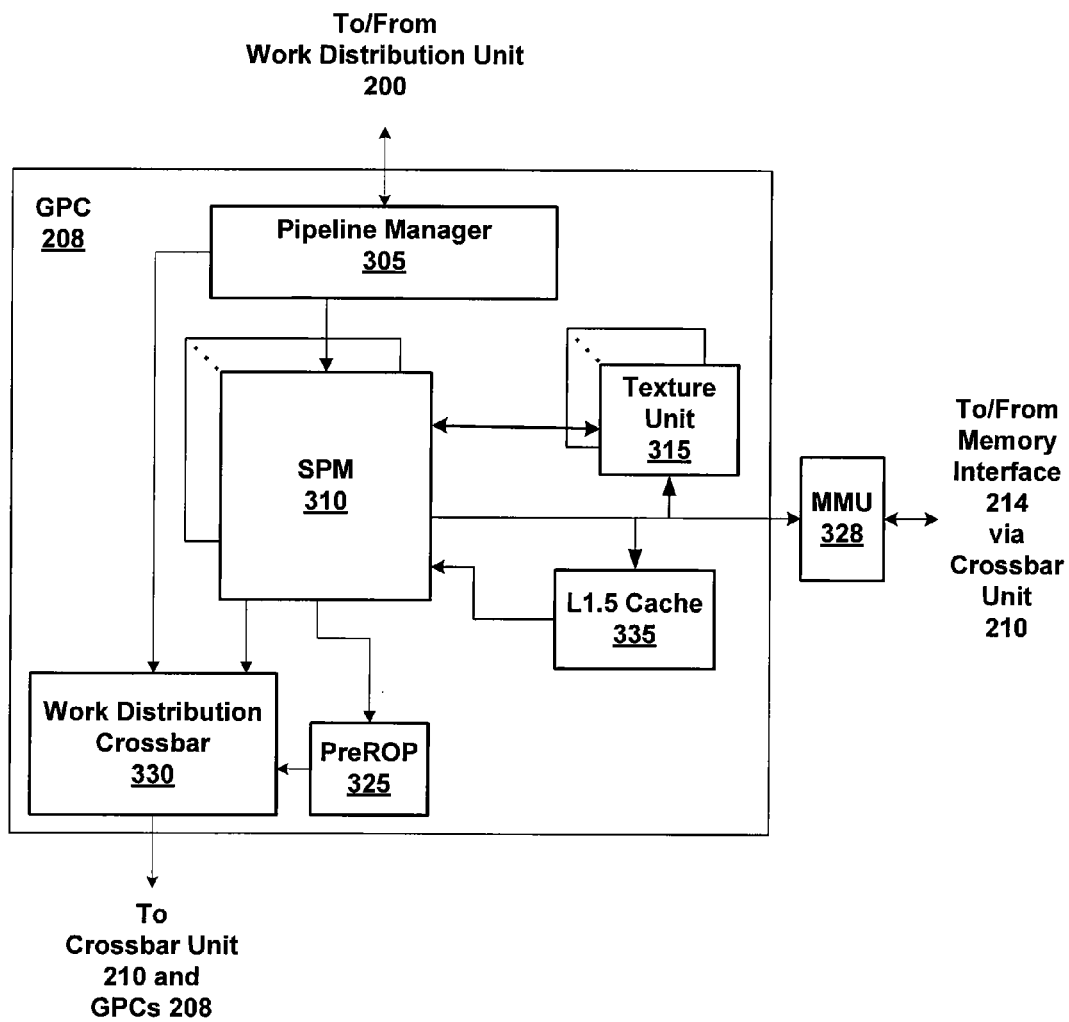
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
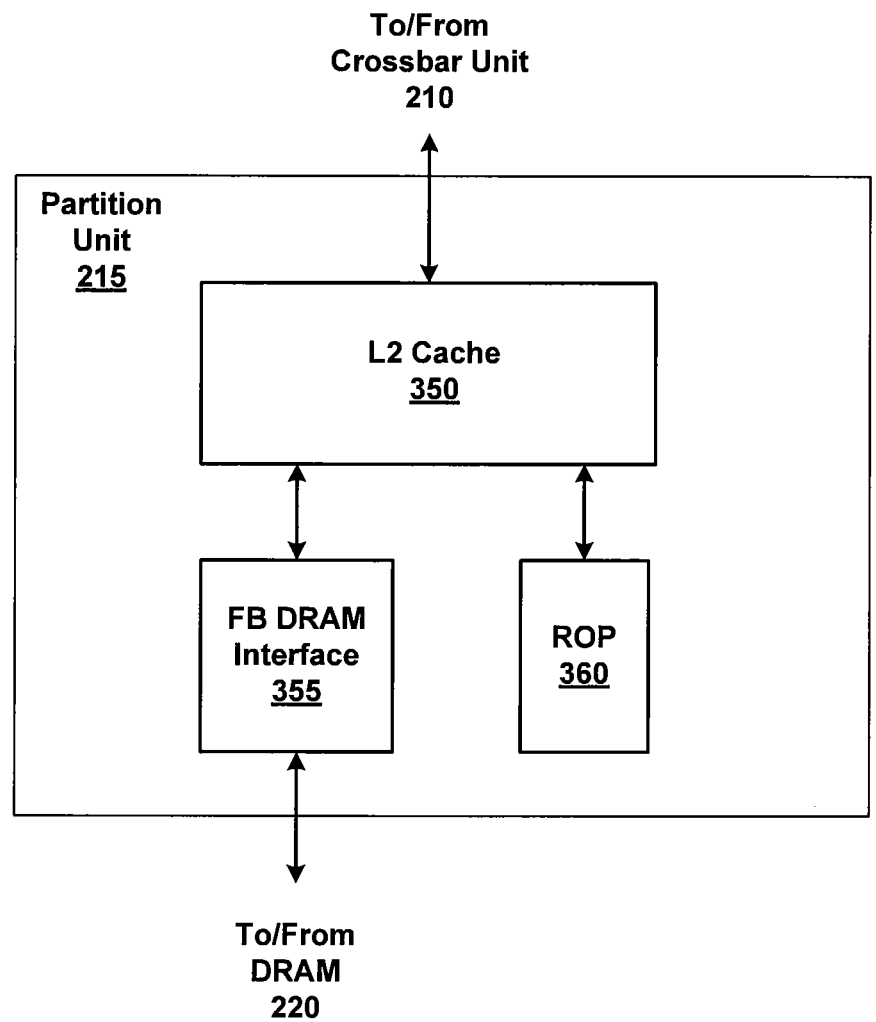
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
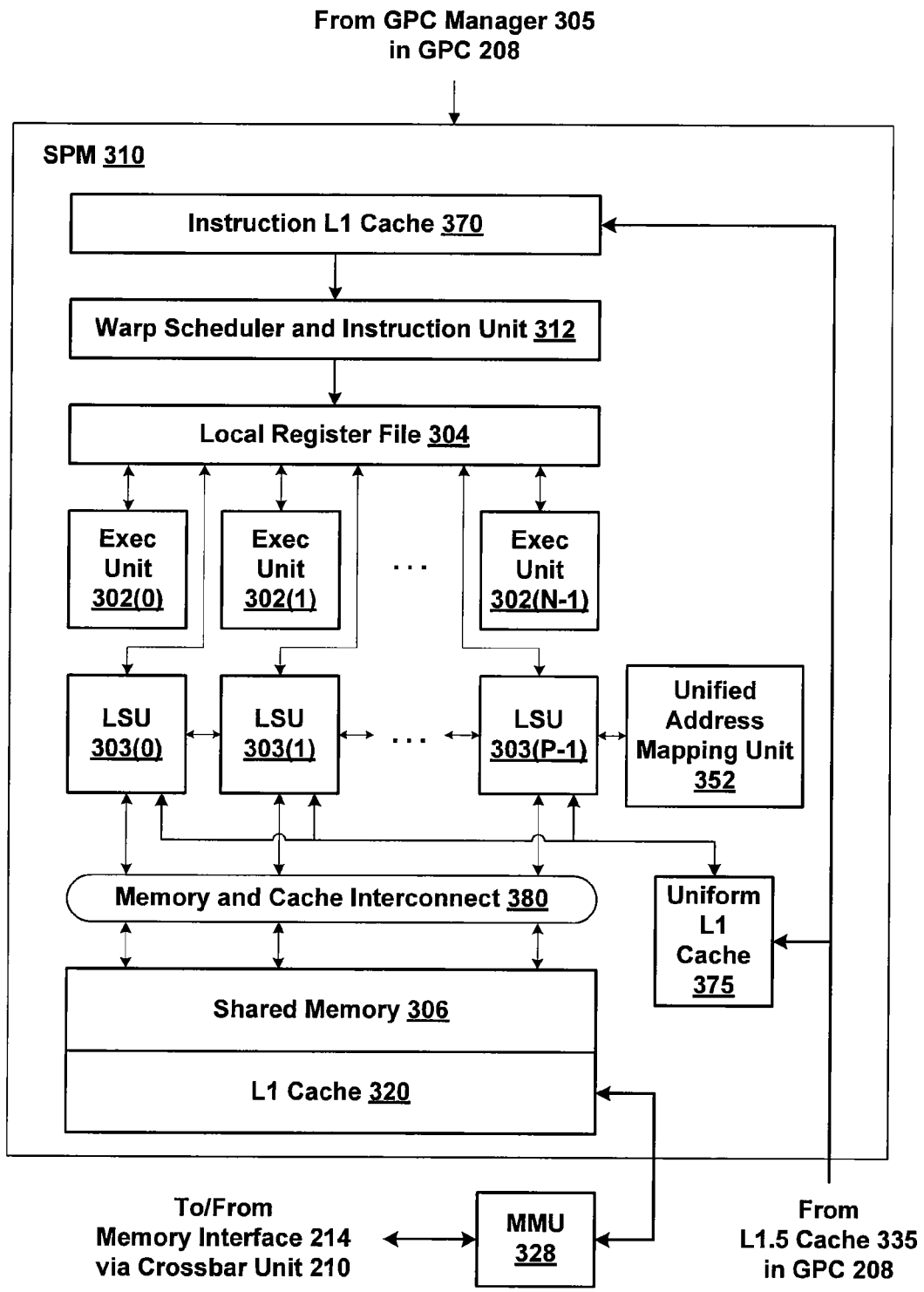
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Graphics Pipeline Architecture

Figure 4:
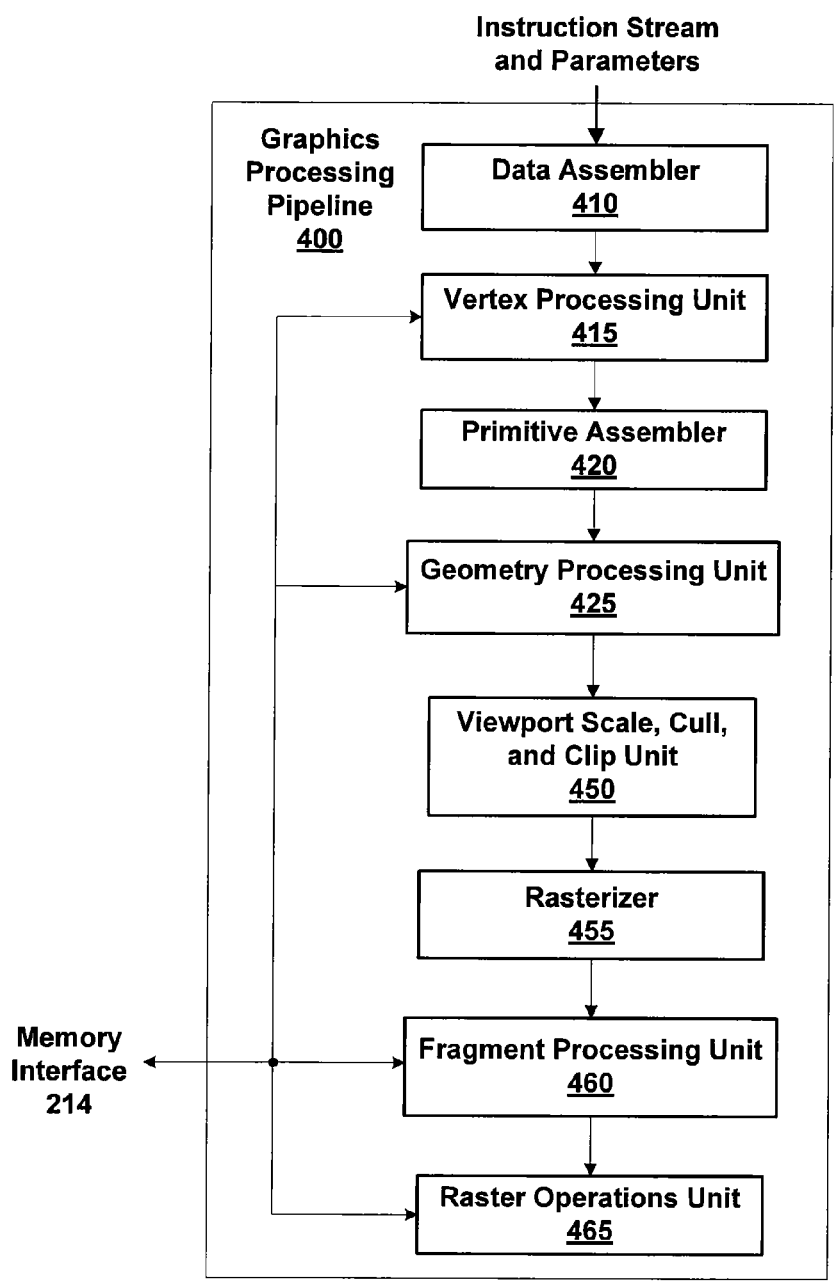
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Figure 5A:
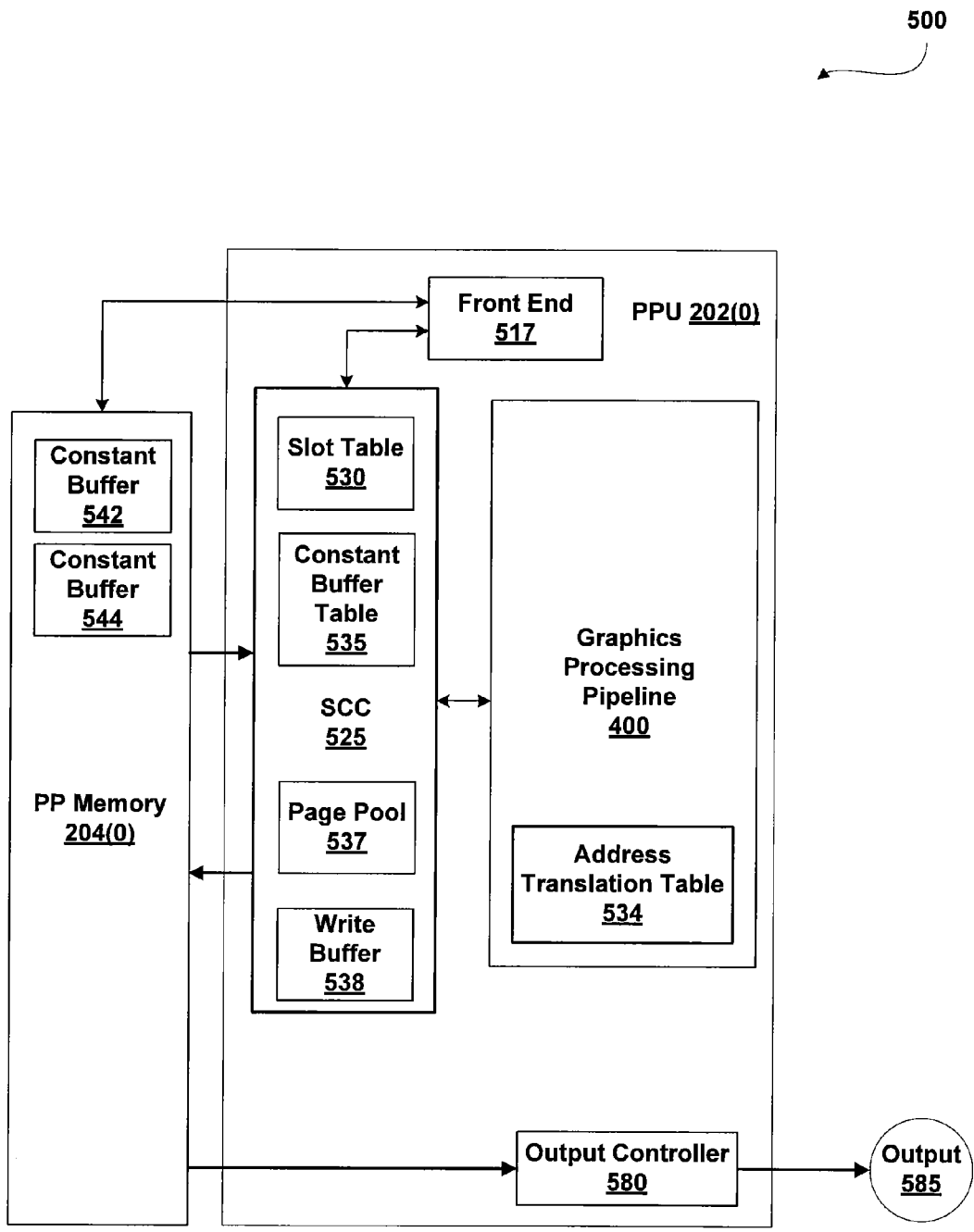
FIG. 5A is a detailed illustration of the PPU and the parallel processing memory, according to one embodiment of the present invention.

FIG. 5A is a detailed illustration of the PPU 202 and the parallel processing memory 204, according to one embodiment of the present invention.

Front end 517 receives commands, interprets and formats the commands, and outputs the formatted commands to graphics processing pipeline 400 via SCC (scalar processor array cache collector) 525. Some of the formatted commands are used by processing units (such as vertex processing unit 415) within graphics processing pipeline 400 to initiate processing of data by providing the location of program instructions or graphics data stored in memory. Front end 517 and SCC 525 each include an interface through which program instructions and data can be read from memory, e.g., any combination of parallel processing memory 204 and system memory 104.

When the data received by graphics processing pipeline 400 has been completely processed, an output 585 of graphics processing pipeline 400 is provided using an output controller 580. Output controller 580 reads pixel data from parallel processing memory 204 and is optionally configured to deliver data to a display device, network, electronic control system, other computing system, such as computing system 100, or another graphics processing pipeline 400, or the like. Alternatively, data is output to a film recording device or written to a peripheral device, e.g., disk drive, tape, compact disk, or the like.

Programmable constants used by the programs executing within the graphics processing pipeline 400 are received by front end 517 and stored in a constant buffer, such as constant buffer 542 and constant buffer 544, by SCC 525. A write buffer, write buffer 538, may be used to buffer constants that have been changed and write them to constant buffer 542 or 544 when write buffer 538 is full, a memory page boundary is crossed, or the like. Write buffer 538 may improve memory access performance and reduce the memory bandwidth that is consumed by combining several writes to constant buffer 542 and 144 into a single write transaction. Each processing unit within graphics processing pipeline 400 has an interface to SCC 525 for reading constant values used as operands.

A constant buffer may be sized to store a complete set of constants, including as many constants as are permitted by an applications programming interface. Although constant buffers 542 and 544 are shown to be stored in parallel processing memory 204, constant buffers may be stored in any memory accessible to SCC 525. An entry of a constant buffer table, constant buffer table 535, is written with a pointer, i.e., base address plus offset, to a constant buffer. A slot table, slot table 530, includes several entries, each of which may be bound to an entry of constant buffer table 535. A separate slot table may be used for each type of shader program, e.g., geometry, vertex, and pixel.

In one embodiment of the present invention, when a programmable constant is changed it is copied to an entry in a page pool, page pool 537, and an address translation table for page pool 537 is updated to correspond to the old version (copy) of the programmable constant. An advantage is that a constant buffer stores the newest version of the programmable constant and all older versions are stored in page pool 537, thereby allowing simultaneous execution of shaders that use the newest version and other shaders that use older versions. In another embodiment of the present invention, a new constant buffer is written with the changed constants and the constant buffer table is changed to point to the newest version of the programmable constants.

Figure 5B:
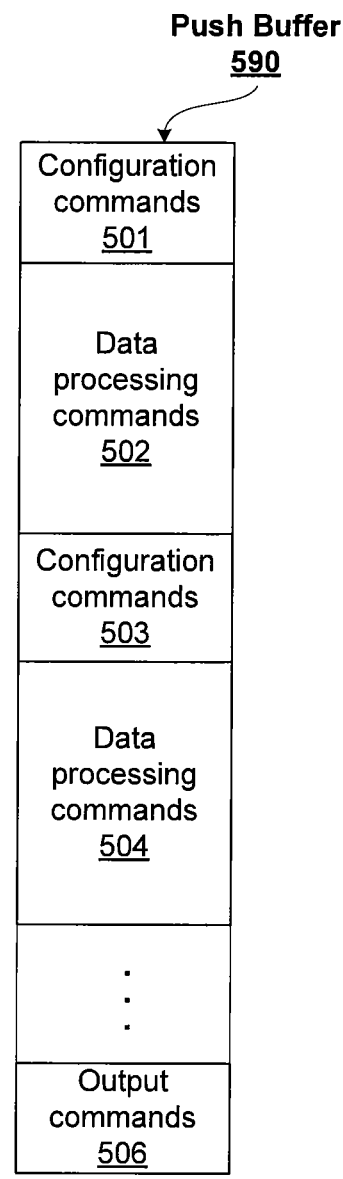
FIG. 5B illustrates a conceptual diagram of a sequence of commands included in the push buffer that configure graphics processing pipeline of FIG. 5A, in accordance with one or more aspects of the present invention.

FIG. 5B illustrates a conceptual diagram of a sequence of commands included in the push buffer 590 that configure graphics processing pipeline 400, in accordance with one or more aspects of the present invention. Push buffer 590 includes configuration commands 501 or 503, data processing commands 502 or 504. Configuration commands 501 or 503 specify the configuration for programmable units within PPU 202, SCC 525, and front end 517. Configuration commands 501 or 503 may be used to set up a particular processing state for use when processing a set of samples. Configuration commands 501 or 503 may include one or more load constant commands, load constant buffer table commands, and bind constant buffer commands. Although the programmable constants may be loaded with particular values that are changed over time, the constants are "read only" during execution of a shader program, i.e., during execution of data processing commands 502 or 504. The programmable constants may be used to change model matrices, base color values, or the like. Configuration commands 501 may specify a first version of constants and configuration commands 503 may specify a second version of constants. Configuration commands 501 or 503 are followed by data processing commands 502 or 504, respectively. Data processing commands 502 or 504 include instructions that specify sample processing operations, such as multiply, add, texture lookup, or the like. Output commands 506 may be included at the end of a shader program to output image data via output controller 580.

Conventional multi-threaded processors may require that a flush (wait for idle) command be included between data processing commands 502 and configuration commands 503 to ensure that constants specified as operands in data processing commands 502 are no longer in use when configuration commands 503 are executed, since configuration commands 503 may change the constants. Flushing the multi-threaded processor may reduce the data processing throughput of the processor and is therefore undesirable. When the systems and method of the present invention are used, flushes are not needed between data processing commands 502 and configuration commands 503 since multiple versions of constants may be accessed by one or more shader programs executing within graphics processing pipeline 400.

Processing units within the graphics processing pipeline 400 may read programmable constants via direct communication paths with SCC 525 using addresses produced using an address translation table 534. Address translation table 534 receives the constant buffer table index and the shader type and provides the virtual address corresponding to the version of the constant stored in page pool 537 or to the page including the version of the constant stored in page pool 537. The offset indicating the position of the constant within the constant buffer may be combined with the virtual address to create an address for a constant within a page. In some embodiments of the present invention, constant buffer table indexes and version values that are not stored in the address translation table 534 correspond to constants that are stored in constant buffer 542 or 544. In other embodiments of the present invention, address translation table 534 also stores virtual addresses for constants stored in constant buffers 542 and 544.

When a constant or portion of a constant buffer is copied to page pool 537, SCC 525 updates address translation table 534 by writing an entry in address translation table 534 with the virtual address of the location in page pool 537 that the constant or portion of the constant buffer is copied to. The entry is indexed by the constant buffer table index and version value provided by SCC 525.

Figure 6A:
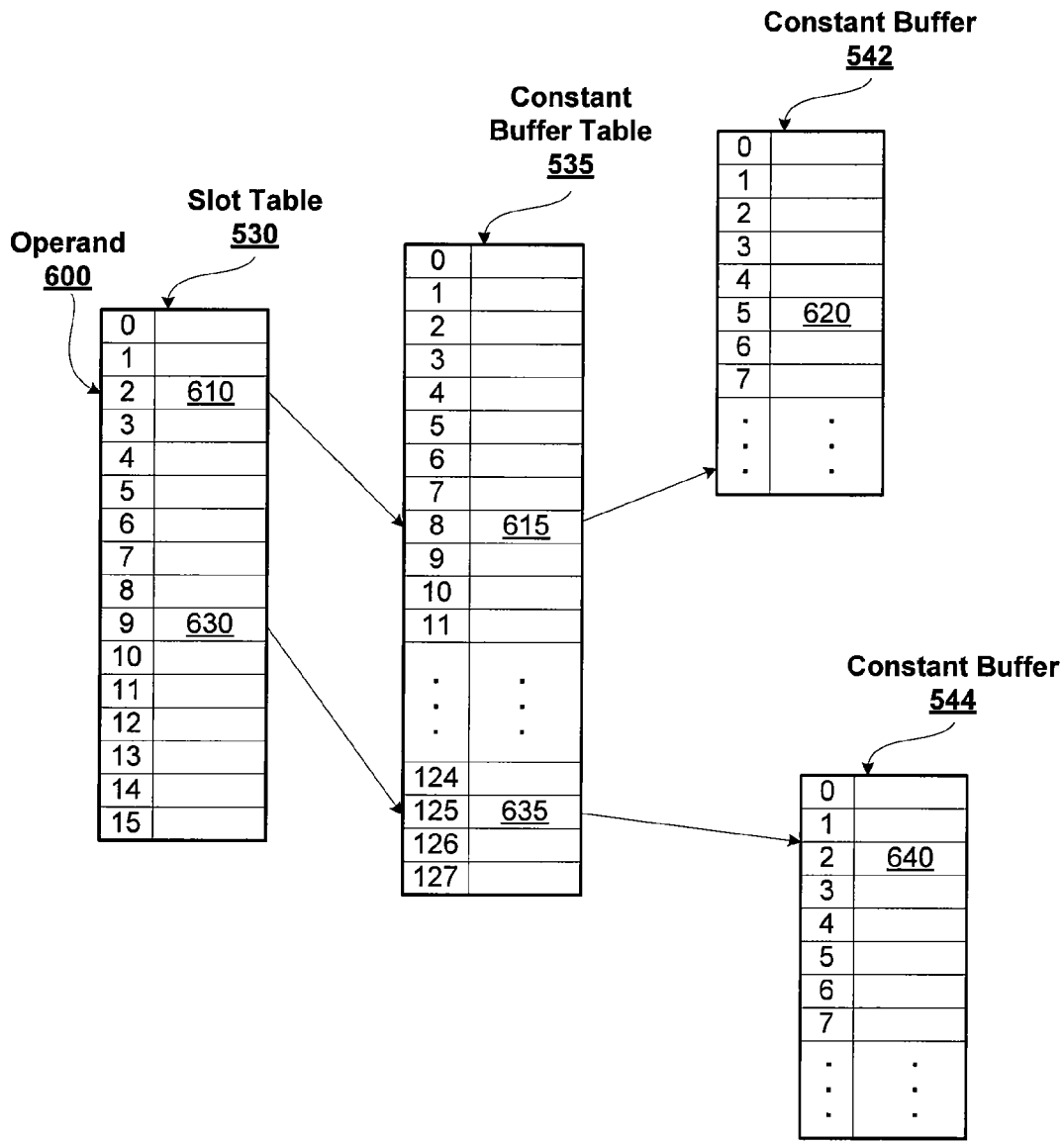
FIG. 6A illustrates a conceptual diagram of the slot table, constant buffer table and constant buffers shown in FIG. 5A in accordance with one or more aspects of the present invention.

FIG. 6A illustrates a conceptual diagram of slot table 530, constant buffer table 535 and constant buffers 542 and 544 of FIG. 5A in accordance with one or more aspects of the present invention. In some embodiments of the present invention, a constant buffer may include as many as 65,536 constant values and each shader type may access as many as 16 constant buffers. The number of constant buffers a shader program may access is limited by the number of entries in slot table 530.

Constant buffer 542 stores a first programmable constant value in a sixth entry, entry 620. Constant buffer 544 stores a second programmable constant value in a third entry, entry 640. Constant buffer table 535 includes 128 entries that may each include a pointer to a constant buffer, e.g. constant buffer 542 and constant buffer 544. In other embodiments of the present invention, constant buffer table 535 includes fewer or more entries. A ninth entry of constant buffer table 535, entry 615 stores a pointer to constant buffer 542, e.g., base address, corresponding to the location of constant buffer 542 in graphics memory. A one-hundred and twenty-sixth entry of constant buffer table 535, entry 635, stores a base address corresponding to constant buffer 544. The base address may be a virtual address corresponding to location in graphics memory or the base address may be an offset specifying a location in graphics memory. An entry in constant buffer table 535 may be written using a load constant buffer table command that specifies the base, a size of the constant buffer, and the index corresponding to an entry of the constant buffer table 535 to be written. Indexes of constant buffer table 535 are shown in the first column of constant buffer table 535.

Programmable constant values may be stored in constant buffer 542 or 544 by first selecting a constant buffer, i.e., specifying an index corresponding to an entry in constant buffer table 535, and providing an offset specifying an entry within the selected constant buffer to start loading with constant values. A load constant selector command may be used to select the constant buffer and specify an offset. A load constant command may be used to specify a set of constant values to load into sequential entries in the selected constant buffer, starting with the entry specified by the offset. For example, entry 620 of constant buffer 542 is specified by offset 5 and entry 640 of constant buffer 544 is specified by offset 2. Constant buffer offsets are shown in the first column of constant buffer 542 and constant buffer 544.

Slot table 530 includes 16 entries that may each include a pointer to an entry in constant buffer table 535. In other embodiments of the present invention, slot table 530 includes fewer or more entries. A third entry of slot table 530, entry 610 stores an index (8) corresponding to constant buffer table 535 entry 615. A tenth entry of slot table 530, entry 630, stores an index (125) corresponding to constant buffer table 535 entry 635. An entry in slot table 530, i.e., a slot, may be written using a bind constant buffer command that binds an entry in slot table 530 to an entry in constant buffer table 535, thereby binding a slot to a particular constant buffer. The bind constant buffer command specifies the index corresponding to an entry in constant buffer table 535 and the slot (entry of slot table 530) to be written. The bind constant buffer command may also include a valid flag to indicate whether the slot should be bound to an entry in constant buffer table 535 or unbound from any entry in constant buffer table 535. In some embodiments of the present invention, a different slot table 530 is used for each type of shader program and the bind constant buffer command specifies the shader program type to indicate a specific slot table to be written. Slots in different slot tables may be configured to store the same index, i.e., an index corresponding to a single entry in constant buffer table 535.

An operand, such as operand 600 that is received with a shader program instruction includes a slot and a constant buffer offset to specify a particular programmed constant value. For example, an operand 600 of c[2][5] specifies the constant value stored in entry 5 of the constant buffer that is bound to the second slot, i.e. entry 620 of constant buffer 542. From a shader program's perspective, there are 16 constant buffers and each constant buffer may have a different size. Note that operand 600 does not include a version value since generation and management of versions of constants is managed by SCC 525 and is therefore "transparent" to the shader program.

Figure 6B:
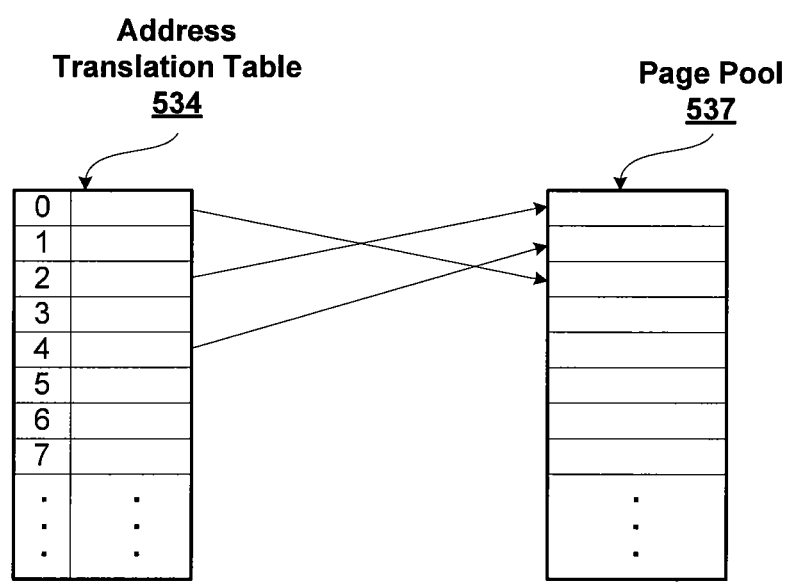
FIG. 6B illustrates a conceptual diagram of the page pool shown in FIG. 5A and an address translation table in accordance with one or more aspects of the present invention.

FIG. 6B illustrates a conceptual diagram of page pool 537 and an address translation table, address translation table 534, shown in FIG. 5A, in accordance with one or more aspects of the present invention. Address translation table 534 receives the constant buffer table index and version value and provides the virtual address corresponding to the version of the constant stored in page pool 537. The offset may be combined with the virtual address to locate a particular constant within the constant buffer.

In some embodiments of the present invention, page pool 537 is written in page size units. Therefore, a location in page pool 537 may store an entire page of memory, not just a single version of a constant and the virtual address provided by address translation table 534 corresponds to a location (page) in page pool 537. When a version of a constant is generated address translation table 534 is updated to store the location of the old version in page pool 537. When old versions of the constants are no longer needed, address translation table 534 is updated to effectively remove the old version from page pool 537, freeing the location that stored the old version in page pool 537.

Figure 7A:
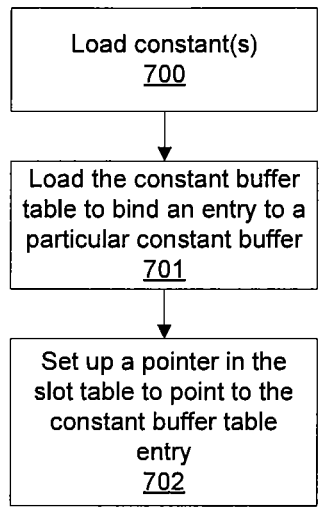
FIG. 7A illustrates a flow diagram of an exemplary method of loading constants and binding to constant buffers in accordance with one or more aspects of the present invention.

FIG. 7A illustrates a flow diagram of an exemplary method of loading constants and binding to constant buffers in accordance with one or more aspects of the present invention. In step 700 one or more constants are loaded into one or more constant buffers, such as constant buffers 542 and 544. In step 701 one or more entries of constant buffer table 535 are written with a base and a size of one or more constant buffers. Each constant buffer table 535 entry also includes a reference count, version value, and "being updated" flag. The reference count indicates the number of valid slots that point to the entry, i.e., slots that store the index corresponding to the entry. The version value corresponds to the current version of a constant buffer. The current version is the version that will be used by any data processing commands subsequently output by SCC 525 to graphics processing pipeline 400. Previous versions of the constants will be used by any data processing commands output before the configuration command that resulted in the new version of the constants. In other embodiments of the present invention, the version value may indicate the number of versions currently active or potentially being accessed. The "being updated" flag indicates when a change to a constant is in-flight within SCC 525 and prevents the generation of a new version until the push buffer execution transitions from configuration commands to data processing commands.

In step 702 a pointer is written in an entry in slot table 530 to bind a slot to a particular constant buffer. Specifically, an index corresponding to an entry of constant buffer table 535 is stored in a slot to bind the slot to the particular constant buffer. The entry in slot table 530 may also include a "bound" flag indicating whether or not the slot is bound to a constant buffer.

Figure 7B:
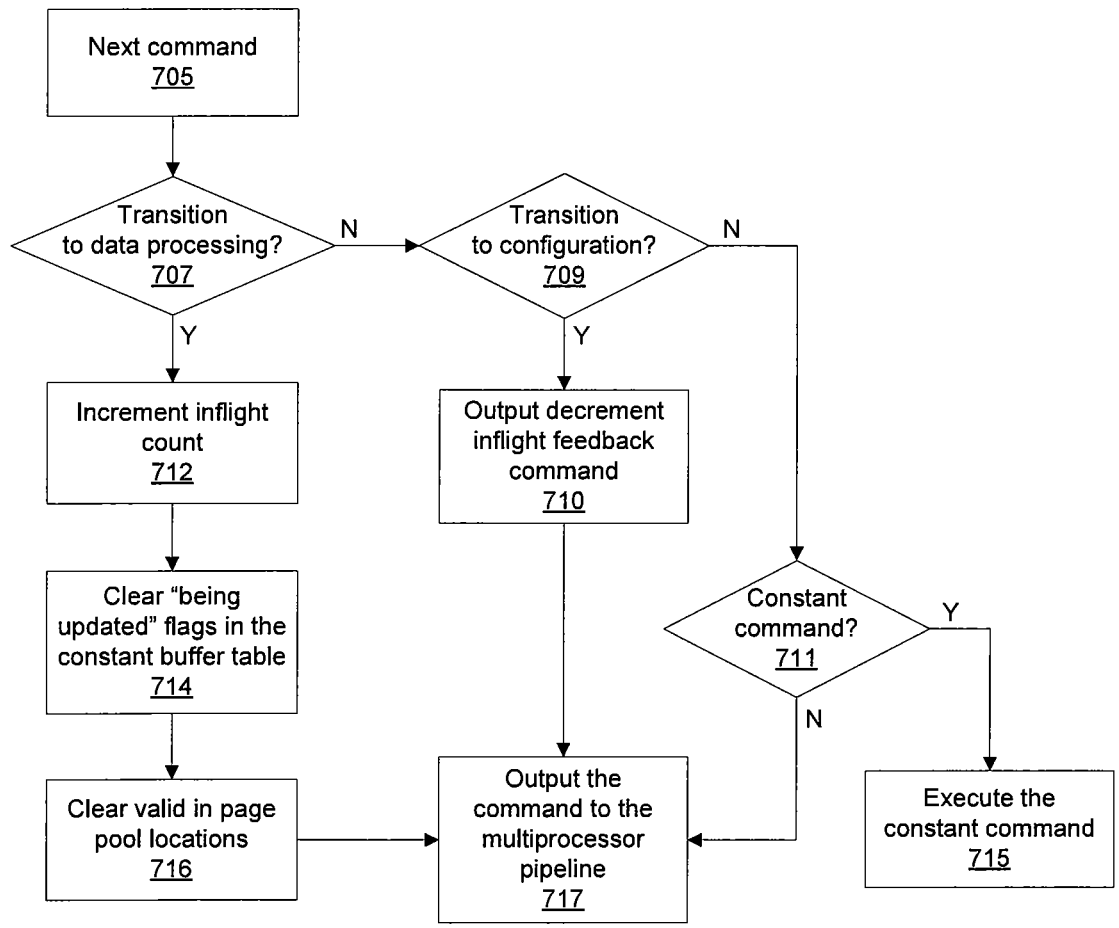
FIG. 7B illustrates a flow diagram of command processing in accordance with one or more aspects of the present invention.

FIG. 7B illustrates a flow diagram of command processing in accordance with one or more aspects of the present invention. SCC 525 receives commands, such as push buffer 590 shown in FIG. 5B, from front end 517. SCC 525 is also configured to generate feedback commands that are input to graphics processing pipeline 400 and are returned from graphics processing pipeline 400 to SCC 525 when all processing units have received them. The feedback commands are used to track and update state related to the programmable constants, as described in conjunction with FIG. 7C.

In step 705 a command, e.g., data processing or configuration, is received by SCC 525. In step 707 SCC 525 determines if the command is a transition from configuration commands to data processing commands, and, if so, then in step 712 SCC 525 increments an inflight count. When each constant is not programmed more than once during a sequence of configuration commands, the inflight count indicates the maximum number of versions of any constant that may be in use in graphics processing pipeline 400. In step 714 the "being updated" flags in constant buffer table 535 are cleared in order to permit generation of a new version of the constants when the next sequence of configuration commands is received. In step 716 valid flags in page pool 537 are cleared to indicate that the page(s) have been updated. When write buffer 538 is included in SCC 525, any data stored in write buffer 538 is stored to the corresponding constant buffer in graphics memory in preparation for constant buffer reads during data processing. In step 717, SCC 525 outputs the data processing command to graphics processing pipeline 400 for execution.

If, in step 707 SCC 525 determines that the command is not a transition from configuration commands to data processing commands, then in step 709 SCC 525 determines if the command is a transition from data processing commands to configuration commands. If, in step 709 SCC 525 determines that the command is not a transition from data processing commands to configuration commands, then in step 711 SCC 525 determines if the command is a constant configuration command, and, if so, in step 715 SCC 525 executes the constant configuration command as described in conjunction with FIGS. 3D, 3E, 4A, 4B, and 6. Constant configuration commands may include a load constant buffer table command, a bind constant buffer command, a load constant command, or the like. If, in step 711 SCC 525 determines that the command is not a constant configuration command, then in step 717 SCC 525 outputs the command to graphics processing pipeline 400 for execution.

If, in step 709 SCC 525 determines that the command is a transition from data processing commands to configuration commands, then in step 710 SCC 525 generates a decrement inflight feedback command and outputs the decrement inflight feedback command to graphics processing pipeline 400. When the decrement inflight feedback command is received by SCC 525 from graphics processing pipeline 400, SCC 525 decrements the inflight count, as described in conjunction with FIG. 7C. In step 715 SCC 525 outputs the configuration command to graphics processing pipeline 400 for execution. In some embodiments of the present invention, some commands are executed by SCC 525 and are not output to graphics processing pipeline 400 for execution.

Figure 7C:
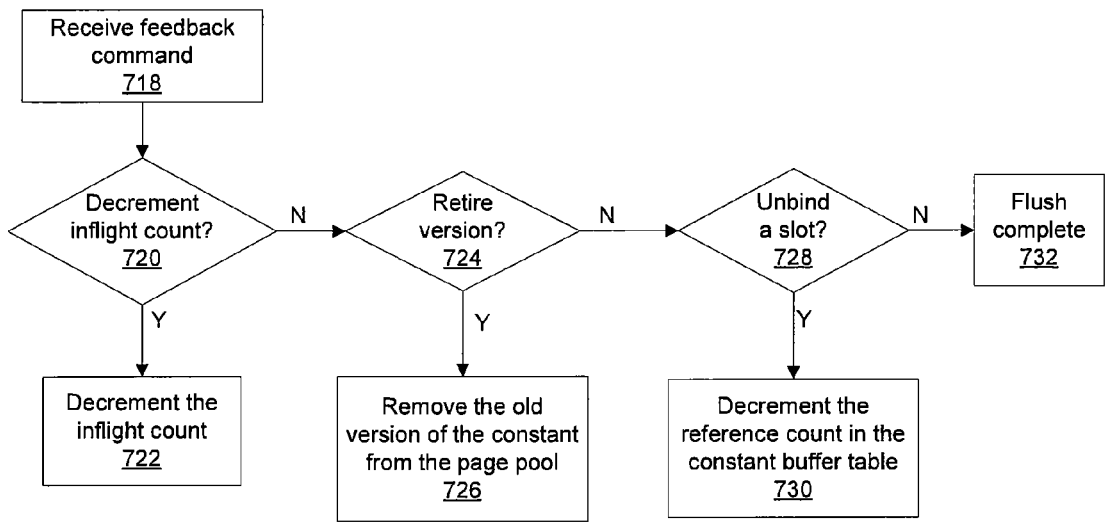
FIG. 7C illustrates a flow diagram of feedback command processing in accordance with one or more aspects of the present invention.

FIG. 7C illustrates a flow diagram of feedback command processing performed by SCC 525 in accordance with one or more aspects of the present invention. In step 718 SCC 525 receives a feedback command from graphics processing pipeline 400. In step 720 SCC 525 determines if the feedback command is a decrement inflight count feedback command, and, if so, in step 722 SCC 525 decrements the inflight count. If, in step 720 SCC 525 determines that the feedback command is not a decrement inflight count feedback command, then in step 724 SCC 525 determines if the feedback command is a retire version feedback command. The conditions under which a retire version feedback command are output are described in conjunction with FIG. 8A.

If, in step 724 SCC 525 determines that the feedback command is a retire version feedback command, then in step 726 SCC 525 removes the old version of the constant from page pool 537. If, in step 724 SCC 525 determines that the feedback command is not a retire version feedback command, then in step 728 SCC 525 determines if the feedback command is an unbind slot feedback command. If, in step 728 SCC 525 determines that the feedback command is an unbind slot feedback command, then in step 730 SCC 525 decrements the reference count stored in the constant buffer corresponding to the index of the slot specified by the unbind slot feedback command. If, in step 728 SCC 525 determines that the feedback command is not an unbind slot feedback command, then the feedback command is a flush feedback command, and in step 732 SCC 525 proceeds with loading constant buffer table 535, as described in conjunction with FIG. 7D.

Figure 7D:
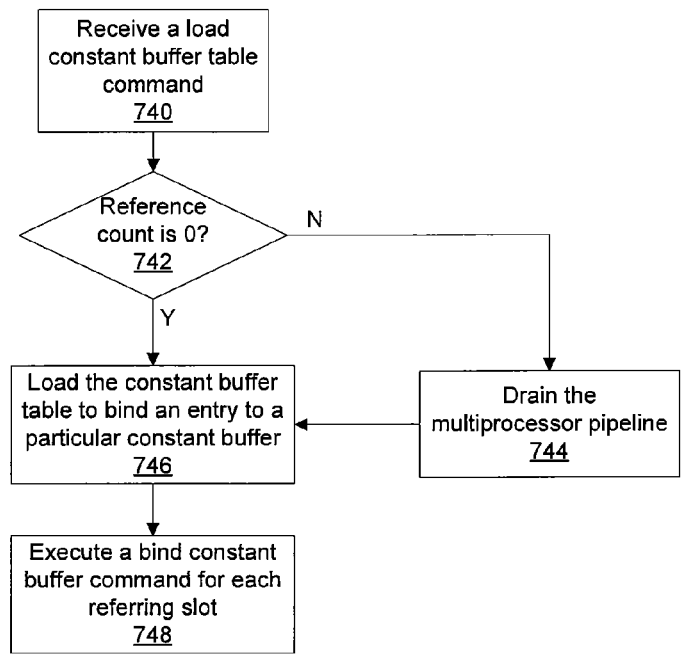
FIG. 7D illustrates a flow diagram of loading a constant buffer table in accordance with one or more aspects of the present invention.

FIG. 7D illustrates a flow diagram of loading constant buffer table 535 in accordance with one or more aspects of the present invention. Once one or more constant buffers, such as constant buffers 542 and 544 have been loaded with constant values, constant buffer table 535 may be written to use the constant values during execution of a shader program. Writing an entry in constant buffer table 535 to point to a different constant buffer is an efficient way to change the constant value used by a shader program, particularly when several or all of the constants are changed.

In step 740 SCC 525 receives a load constant buffer table command to write an entry in constant buffer table 535. In some embodiments of the present invention, a load constant buffer table command includes a base, size, and index. The index indicates the entry to be written with base and size of a particular constant buffer. In step 742 SCC 525 determines if the reference count stored in the entry is equal to 0, and, if so, no slots of slot table 530 are bound to the entry and SCC 525 proceeds to step 746. If, in step 742 SCC 525 determines that the reference count stored in the entry is not equal to 0, then in step 744 SCC 525 outputs a flush feedback command to graphics processing pipeline 400 and waits for the flush feedback command to return after graphics processing pipeline 400 is flushed. Flushing graphics processing pipeline 400 ensures that any shader programs have completed execution and that any constants may be changed without adversely affecting the results of the shader programs. Therefore, when using a load constant buffer table command to change constants, it is best to bind a constant buffer including the changed constants to an entry in constant buffer table 535 that is not bound to a slot of slot table 530.

In step 746 SCC 525 writes the entry corresponding to the index with the base and size to bind the entry to the particular constant buffer corresponding to the base. In some embodiments of the present invention, in step 746 the version count stored in the entry is incremented. In step 748 SCC 525 generates and executes a bind constant buffer command for each slot of slot table 530 that is bound to the entry, i.e. for each referring slot. It is necessary to execute the bind constant buffer command in order to update the address translation for each slot that is now bound to a different constant buffer.

Figure 7E:
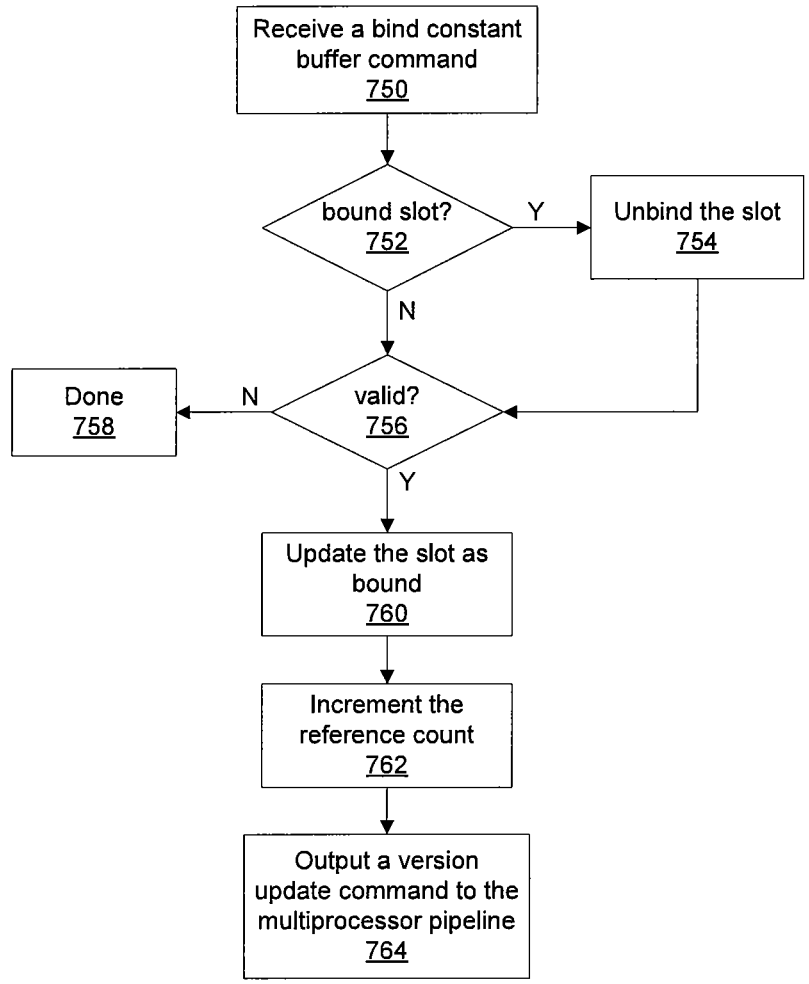
FIG. 7E illustrates a flow diagram of binding a constant buffer to a slot in accordance with one or more aspects of the present invention.

FIG. 7E illustrates a flow diagram of binding a constant buffer, such as constant buffer 542 or 544, to a slot of slot table 530 in accordance with one or more aspects of the present invention. In step 750 SCC 525 receives a bind constant buffer command. The bind constant buffer command may have been generated by SCC 525 in step 748 during the execution of a load constant buffer table command. The bind constant buffer command may include a valid flag, shader type (pixel, vertex, or geometry), slot identifier, and index corresponding to an entry in constant buffer table 535.

In step 752, SCC 525 determines if the slot corresponding to the slot identifier is bound to a constant buffer, and, if so, in step 754 SCC 525 unbinds the slot. Specifically, in step 754 SCC 525 generates and outputs a unbind feedback command including the index stored in the slot corresponding to the slot identifier to graphics processing pipeline 400. SCC 525 then clears the bound flag in the slot corresponding to the slot identifier. When the unbind feedback command is later received from graphics processing pipeline 400, the reference count in constant buffer table 535 corresponding to the index in the unbind feedback command is decremented.

If, in step 752, SCC 525 determines that the slot corresponding to the slot identifier is not bound to a constant buffer, then SCC 525 proceeds to step 756. In step 756 SCC 525 determines if the valid flag provided with the bind constant buffer command is asserted, and, if not, then in step 758 execution of the bind constant buffer command is complete, i.e., the slot is now unbound. If, in step 756 SCC 525 determines that the valid flag provided with the bind constant buffer command is asserted, then in step 760 SCC 525 proceeds to bind the slot to a constant buffer.

In step 760, SCC 525 sets the bound flag for the slot corresponding to the slot identifier. In step 762 SCC 525 increments the reference count of the entry in constant buffer table 535 corresponding to the index. In step 764 SCC 525 generates and outputs a version update command to graphics processing pipeline 400. The version update command is used to update an address translation table, such as address translation table 534, so that the virtual address of the constant buffer that the slot is now bound to will be used to read constants during execution of a shader program. Therefore the version update command is output to the processing units via the same path as the data processing commands, i.e., the version update command is not communicated through the separate paths between SCC 525 and the graphics processing pipeline 400.

Any shader program data processing command executed by an engine that has updated an address translation table 534 by executing the version update command will read constant values from the constant buffer bound to the slot by the bind constant buffer command received in step 750. Any shader program data processing command executed by an engine that has not yet updated the address translation table 534 by executing the version update command will read constant values from the constant buffer that was previously bound to the slot. Therefore, shader programs may continue executing without flushing graphics processing pipeline 400 when constant buffers are changed. The version update command includes the constant buffer table 535 index and version value. The version update command may also include the shader type of the slot table being written.

When the majority of the constant values in a constant buffer will be changed, it is efficient to use the previously described technique of binding a slot to a changed constant buffer (or newly written constant buffer) to effectively change the constant values. When fewer constant values are changed, a different method, described in conjunction with FIGS. 8A, 8B, and 8C, may be used to change the values in the constant buffer and generate one or more versions of a single constant or multiple constants in a constant buffer.

Figure 8A:
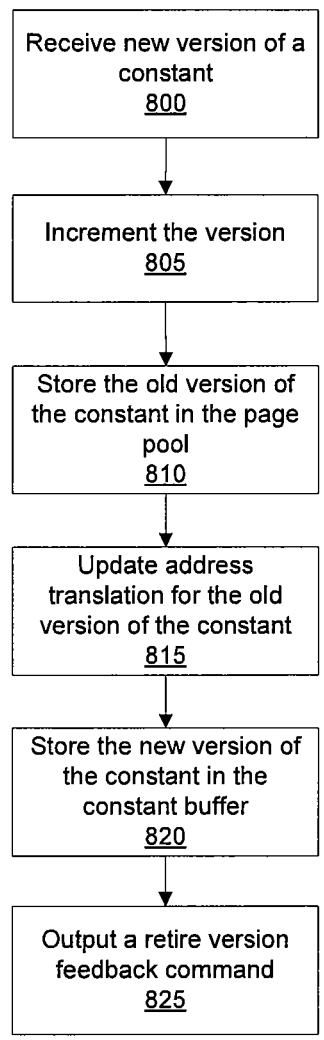
FIGS. 8A and 8B illustrate flow diagrams of exemplary methods of creating versions of constants in accordance with one or more aspects of the present invention.

FIG. 8A illustrates a flow diagram of an exemplary method of creating versions of constants in accordance with one or more aspects of the present invention. Versions of constants are generated to avoid flushing graphics processing pipeline 400 when one or more constants are changed. When a new version of a constant is generated, the old version of the constant is copied to page pool 537. In step 800 a new version of a constant is received by SCC 525 via a load constant command. In step 805 SCC 525 increments the version stored in the entry of constant buffer table 535 that points to the constant buffer to be written with the new version of the constant. In step 810 the old version of the constant is stored in a location in page pool 537.

In step 815 the address translation corresponding to the old version of the constant is updated in order to complete execution of shader programs using the old version of the constant. Unlike the previous method of generating versions of constants by binding to a different constant buffer, the address translation tables 534 are updated in parallel when a new version of a constant is generated.

In step 825 SCC 525 outputs a version retire feedback command so that the old version of the constant will be retired when SCC 525 receives the version retire feedback command from the graphics processing pipeline 400. Retiring old versions of constants reduces the number of locations needed in page pool 537 to store all of the old versions of constants that may be accessed by any active shader programs. An advantage of changing individual constants within a buffer while retaining unchanged constants, is that unchanged constants stored in a cache within PPU 202 are retained and bandwidth needed to read the unchanged constants is reduced compared with the previously described technique of replacing the entire constant buffer by binding to a different constant buffer.

Figure 8B:
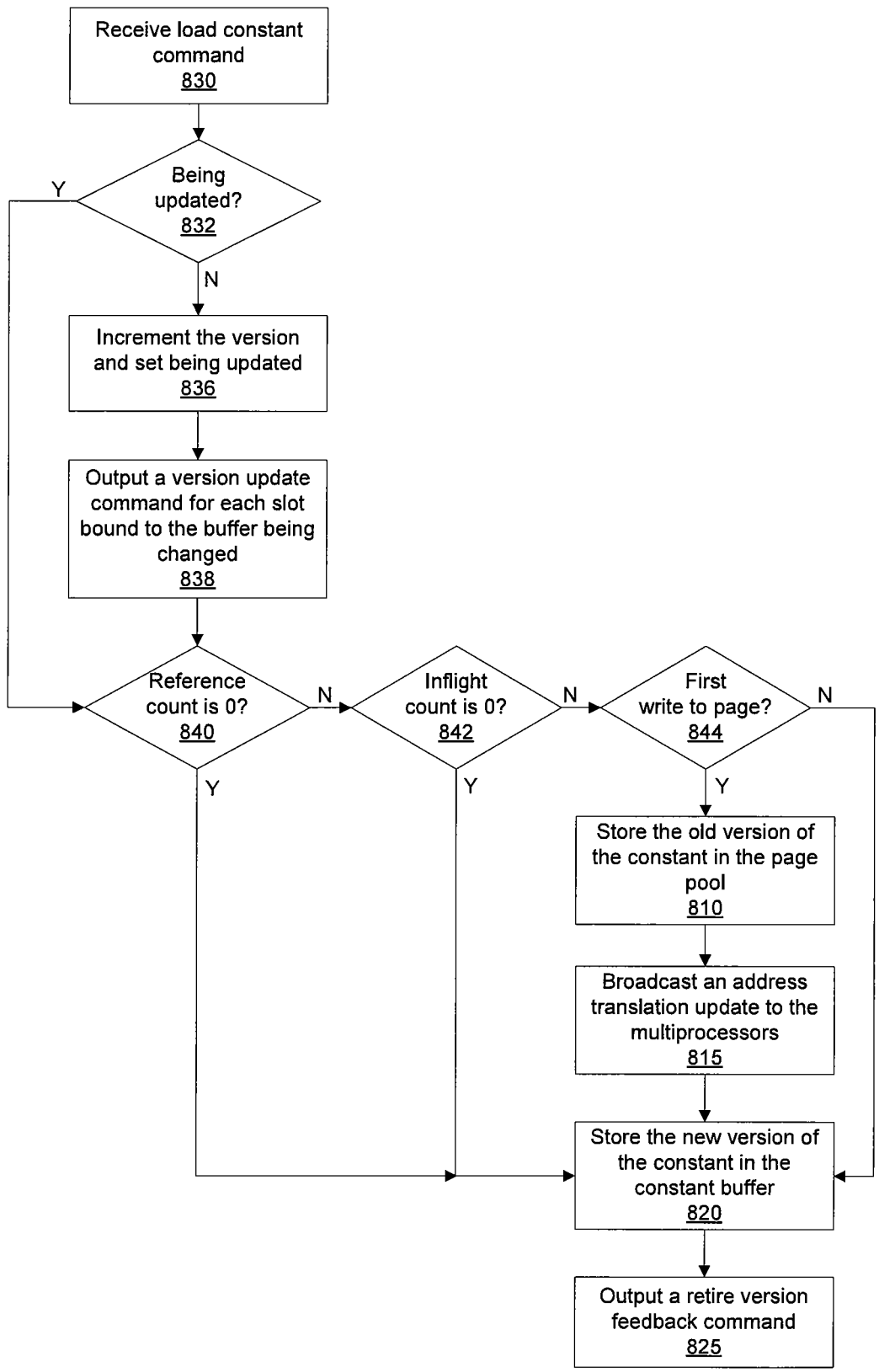

FIG. 8B illustrates a flow diagram of an exemplary method of executing a load constant command by SCC 525 in accordance with one or more aspects of the present invention. In step 830 SCC 525 receives the load constant command. In step 832 SCC 525 reads the entry corresponding to the index provided with the load constant command and determines if the "being updated" flag is set. If the "being updated" flag is set in step 832, then SCC 525 proceeds directly to step 840 and the version value is not updated.

If, in step 832 the "being updated" flag is not set, then in step 836 SCC 525 increments the version value in the entry corresponding to the index and sets the "being updated" flag. Setting the "being updated" flag indicates that a constant in the constant buffer corresponding to the index has been changed. Therefore, at least a portion of the constant buffer will have been copied to page pool 537 and the version value will have been incremented. The constant buffer should be copied to page pool 537 before any of the constants stored in the constant buffer are changed in order to preserve the old constant values. In some embodiments of the present invention when a constant is changed, only the old constant is copied to page pool 537. In other embodiments of the present invention, the (memory) page in the constant buffer that includes the old constant is copied to page pool 537. The granularity of address translation table 534 should match the granularity of the constant buffer that is copied to page pool 537 in order to read the correct version of a constant for each shader program. Therefore, address translation table 534 may store single constant addresses or page addresses, depending on the size of the copies to page pool 537.

All of the "being updated" flags in constant buffer table 535 are cleared when the commands transition from configuration commands to data processing commands, as previously described in conjunction with step 714 of FIG. 7B. Therefore, the version value for each constant buffer is only incremented once for each set of configuration commands and the constant buffer corresponding to that version value is used during execution of the subsequent data processing commands. For example, a first version value is associated with configuration commands 501 that are used during execution of data processing commands 502 and a second version value is associated with any command buffer that includes a constant changed by configuration commands 503 that are used during execution of data processing commands 504. As more sets of configuration commands are processed the version values corresponding to different constant buffers may vary since the constant buffers may be changed at different rates.

In step 838 SCC 525 generates and outputs a version update command to graphics processing pipeline 400 for each slot that is bound to the constant buffer corresponding to the index.

In step 840 SCC 525 determines if the reference count corresponding to the index is equal to 0, and, if so, SCC 525 proceeds directly to step 820 since no slots are bound to the constant buffer corresponding to the index. Otherwise, in step 842, SCC 525 determines if the inflight count is equal to 0, and, if so, SCC 525 proceeds directly to step 820 since data processing has completed. Otherwise, in step 844, SCC 525 determines if the load constant command will result in the first write to a page of the constant buffer corresponding to the index, and, if so, in step 810 the page of the constant buffer that corresponds to the index and includes the constant to be changed, is copied from the constant buffer to a location in page pool 537. The granularity used in step 810, e.g., memory page, entry storing a single constant, or the like, should match the granularity of the constant buffer that is copied to page pool 537. Using a smaller granularity, such as an entry storing a single constant, is most efficient when only a few entries in a constant buffer are changed since only the constants that will be changed are copied to page pool 537. However, as previously mentioned, the granularity of address translation table 534 should match the granularity of the copies in order to track the location of old versions of constants.

In step 815 an address translation update is generated by SCC 525 and broadcast to the graphics processing pipeline 400. The address translation update includes the location in page pool 537 where the constant buffer was copied and is stored in address translation table 534 in each processing unit and should be broadcast to the processing units since the old constants that may be read are being moved. The constant buffer may be identified by the version value, shader type, and index when different slot tables are used for each shader type. Alternatively, the constant buffer may be identified by the index and version value.

In step 820, the constant is changed, i.e., the new value provided by the load constant command is written by SCC 525 into the constant buffer corresponding to the index. In step 825, SCC 525 generates and outputs a retire version feedback command to graphics processing pipeline 400. When the retire version feedback command is received from graphics processing pipeline 400 by SCC 525, SCC 525 removes the old version of the constant from page pool 537 since it is no longer needed by any active shader programs.

Figure 8C:
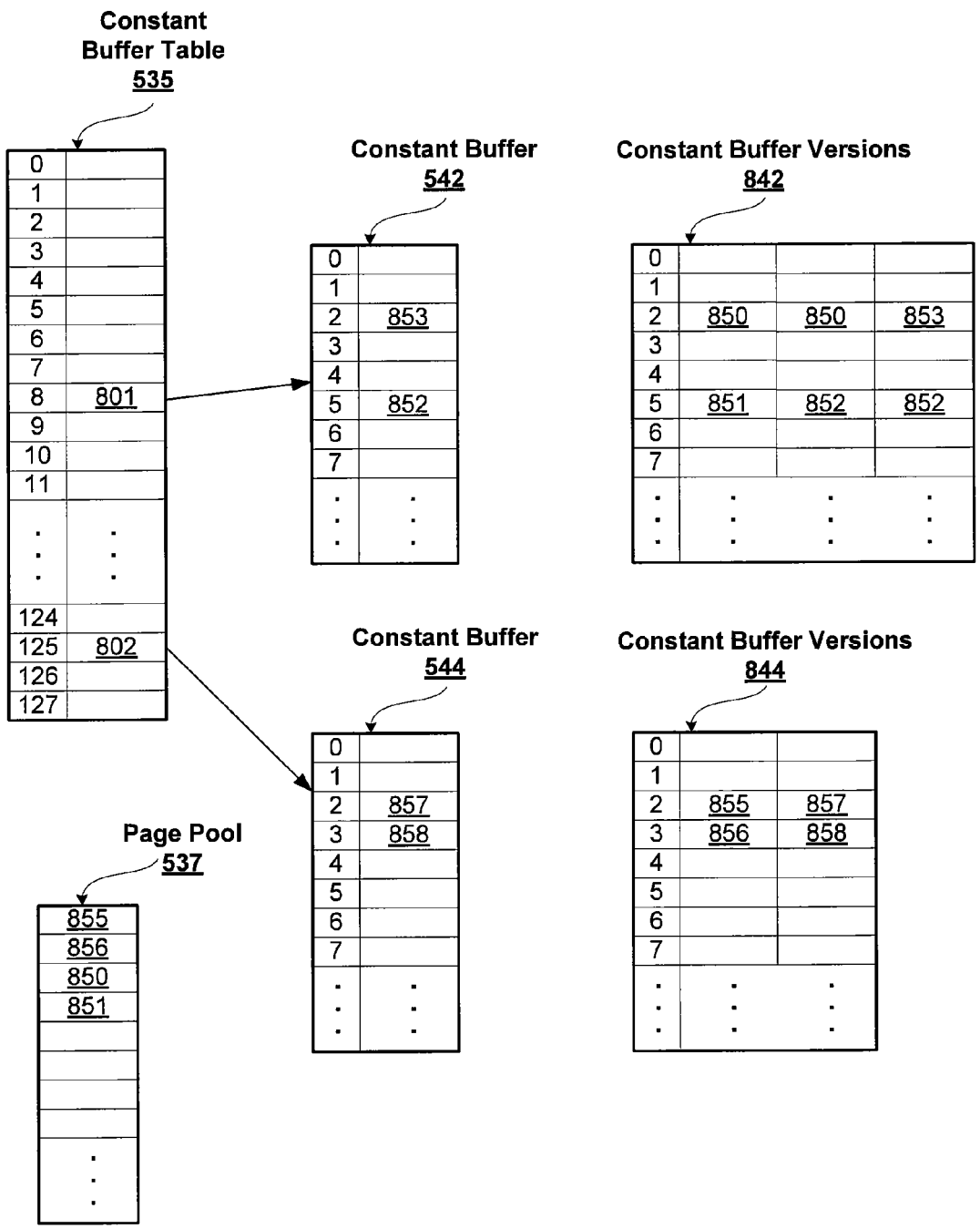
FIG. 8C illustrates a conceptual diagram of the constant buffer table, constant buffers, and page pool shown in FIG. 5A in accordance with one or more aspects of the present invention.

FIG. 8C illustrates a conceptual diagram of constant buffer table 535, constant buffers 542 and 544, and page pool 537 shown in FIG. 5A in accordance with one or more aspects of the present invention. Constant buffer versions 842 illustrate the versions that are generated when constant buffer 542 is changed. Each column of constant buffer versions 842 corresponds to a different version value of constant buffer 542. Similarly, constant buffer versions 844 illustrates the versions that are generated when constant buffer 544 is changed and each column of constant buffer versions 844 corresponds to a different version value of constant buffer 544. The rightmost columns of constant buffer versions 842 and 844 represent the contents of constant buffers 542 and 544, respectively.

An entry 801 of constant buffer table 535 that corresponds to index 8 stores a base specifying the location of constant buffer 542. A first set of configuration commands changed the constant stored at offset 5. The original constants stored at offsets 2 and 5 are shown in the first column of constant buffer versions 842, constant 850 and 851, respectively. When constant 851 was changed, it was copied to page pool 537, and constant 852 was stored at offset 5 of constant buffer 542. The version value of constant buffer 542 stored in entry 801 of constant buffer table 535 was incremented. An entry in each address translation table 534 is created to store the location in page pool 537 that stores constant 851. In embodiments of the present invention that copy entire memory pages, each location in page pool 537 stores a page and a page containing the changed constant is copied from constant buffer 542 to page pool 537.

A second set of configuration commands changed constant 850 stored in constant buffer 542 at offset 2. When constant 850 was changed, it was copied to page pool 537, and constant 853 was stored at offset 2 of constant buffer 542. The version value of constant buffer 542 stored in entry 801 of constant buffer table 535 was incremented. Note that the version number would not have been incremented if the first set of configuration commands had changed both constant 850 and constant 851. Another entry in each address translation table 534 is created to store the location in page pool 537 that stores constant 850.

An entry 802 of constant buffer table 535 stores a base specifying the location of constant buffer 544. A third set of configuration commands changed the constants stored at offsets 2 and 3 of constant buffer 544. The original constants stored at offsets 2 and 3 are shown in the first column of constant buffer versions 844, constant 855 and 856, respectively. When constants 855 and 856 were changed, they were copied to page pool 537, and constants 857 and 858 were stored at offsets 2 and 3 of constant buffer 544, respectively. The version value of constant buffer 544 stored in entry 802 of constant buffer table 535 was incremented. At least one entry in each address translation table 534 is created to store the location in page pool 537 that stores constants 855 and 856. In some embodiments of the present invention, constants 855 and 856 are stored in the same page of constant buffer 544 and they are stored in a single page within page pool 537. Write buffer 538 may be used to accumulate constant values to be written to page pool 537. Therefore, a single write transaction may be used to efficiently copy several constant values or one or more pages of constant values from write buffer 538 to page pool 537 instead of using a write transaction for each individual constant value.

Accessing State Information via Constant Buffers

Figure 9A:
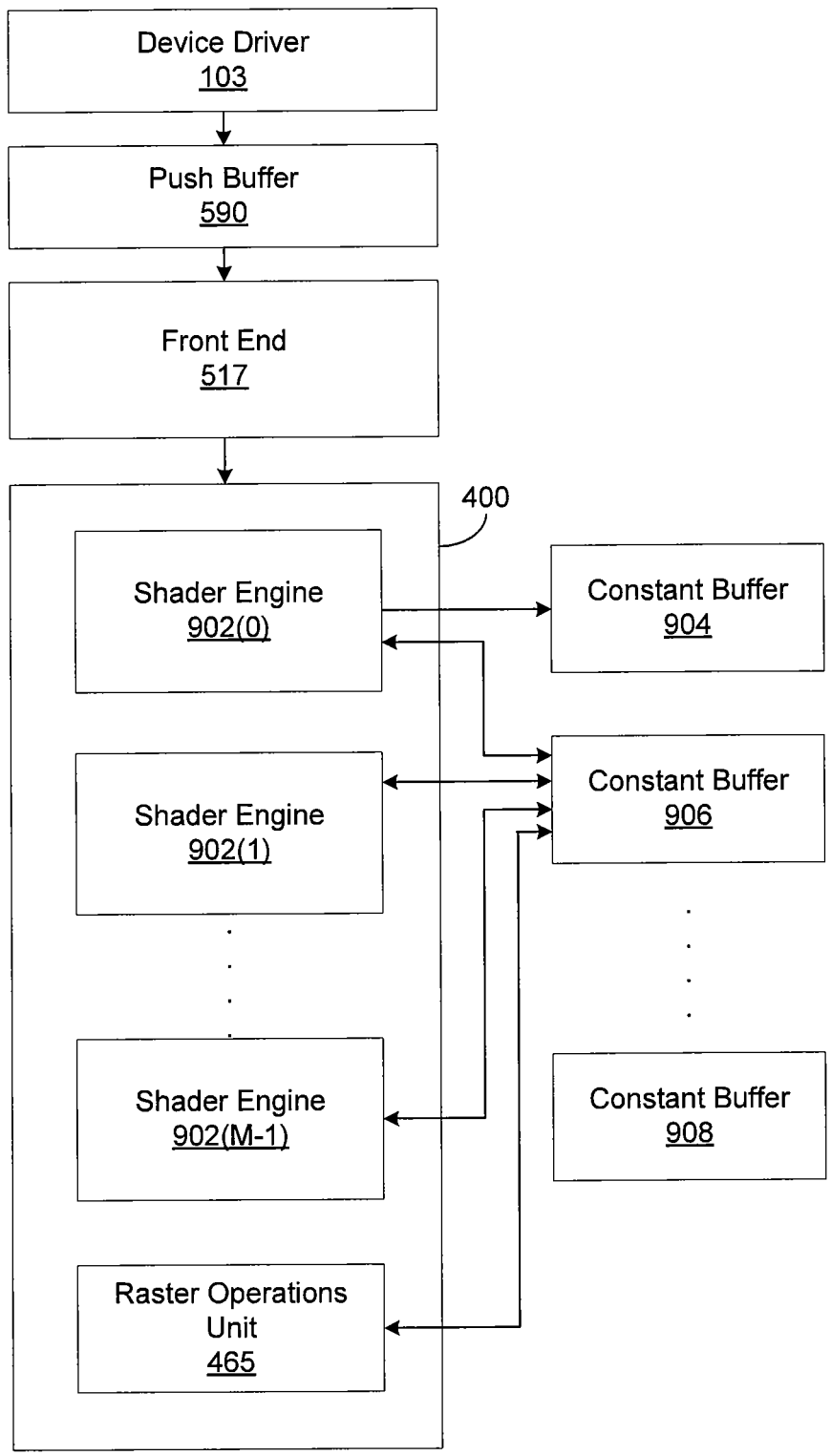
FIG. 9A illustrates a computing system in accordance with one or more aspects of the present invention.

FIG. 9A illustrates a computing system in accordance with one or more aspects of the present invention. As shown, the graphics pipeline 400 includes several shader engines 902. Constant buffers 904, 906, 908 operate as described above in conjunction with FIGS. 5A-8C. In this embodiment, constant buffer 904 is bound to shader engine 902(0), constant buffer 906 is bound to each of the shader engines 902, and constant buffer 908 is not bound.

In operation, an application accessing the parallel processing subsystem 112 transmits commands and state information to the device driver 103. Based on the commands and state information, the device driver 103 then generates the push buffer 590 for submission to the parallel processing subsystem 112, more specifically, to the PPU 202(0) within the parallel processing subsystem 112.

In one embodiment, for each pipeline state update command transmitted by the application, the device driver 103 generates a constant buffer update command. The constant buffer update command stores the pipeline state transmitted by the application in the constant buffer that is bound to each of the shader engines, namely constant buffer 906. As previously described herein, multiple versions of the state information are maintained and can be in-flight at the same time. Each of the shader engines 902 are then able to access the pipeline state stored in constant buffer 906.

Figure 9B:
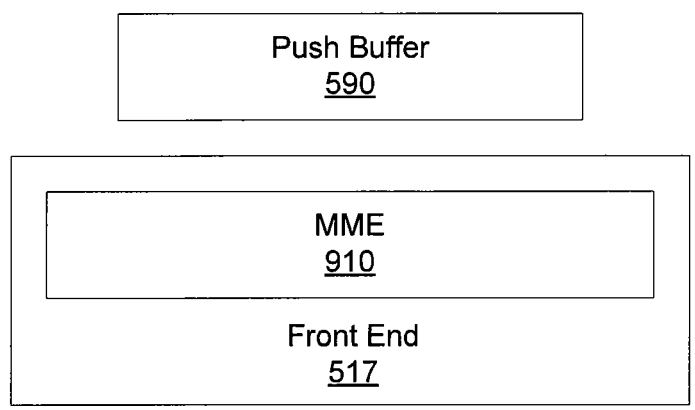
FIG. 9B illustrates a more detailed view of the front end, according to another embodiment of the invention.

FIG. 9B illustrates a more detailed view of the front end 517 according to another embodiment of the invention. As shown, the front end 517 includes a method macro expander (MME) 910. The device driver 103 programs the MME 910 with macros that, when executed, generate constant buffer update commands to update pipeline state in constant buffer 906. The device driver 103 then transmits pipeline state received from the application directly to the MME 910. The device driver 103 also invokes the macros in the MME 910 that cause the MME 910 to generate constant buffer update commands based on the pipeline state, and in some embodiments, additional commands that update the pipeline state in the graphics processing pipeline 400. In one embodiment, the device driver 103 compresses the pipeline state, and a macro executed by the MME 910 decompresses the pipeline state before updating the constant buffer 906 in addition to updating the hardware pipeline state.

Figure 9C:
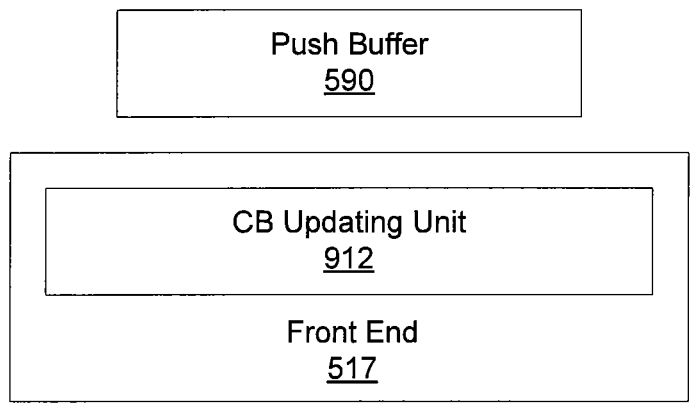
FIG. 9C illustrates a more detailed view of the front end, according to another embodiment of the invention.

FIG. 9C illustrates a more detailed view of the front end 517 according to another embodiment of the invention. As shown, the front end 517 includes a constant buffer (CB) updating unit 912. In operation, the device driver 103 transmits pipeline state received from the application to the CB updating unit 912 via pushbuffer 590. The CB updating unit 912 then automatically generates constant buffer update commands to update pipeline state in constant buffer 906 in addition to commands to commands to update the hardware pipeline state. Each of the shader engines 902 are then able to access the pipeline state stored in constant buffer 906.

In one embodiment, the pipeline state includes graphics state needed by the graphics processing pipeline 400 to perform graphics operations. The graphics state may include: one or more parameters for performing blend operations on graphics data; one or more parameters associated with color and/or depth render targets; one or more parameters associated with depth testing; or one or more parameters associated with clipping.

Figure 10:
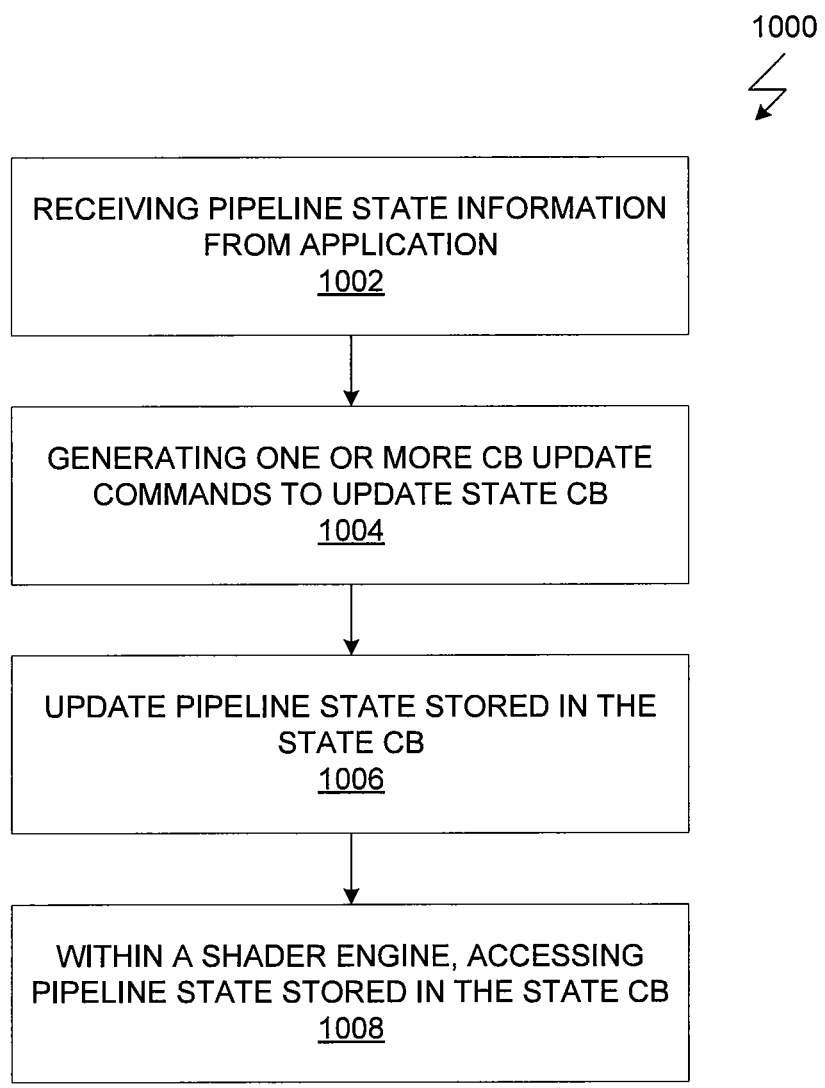
FIG. 10 is a flow diagram of method steps for updating pipeline state in a constant buffer, according to one embodiment of the present invention.

FIG. 10 is a flow diagram of method steps for updating pipeline state in a constant buffer, according to one embodiment of the present invention. Although the method steps are described in conjunction with the systems for FIGS. 1-5B, persons skilled in the art will understand that any system configured to perform the method steps, in any order, is within the scope of the invention.

The method 1000 begins at step 1002, where the device driver 103 receives pipeline state information from an application accessing the PPU 202. At step 1004, the device driver 103 generates one or more constant buffer update commands to update constant buffer 906, which is bound to each of the shader engines 902, with the pipeline state information received from the application. In another embodiment, the constant buffer update commands are generated by the MME 910 based on the pipeline state received from the device driver 103. In yet another embodiment, the constant buffer update commands are generated by the CB updating unit 912 based on the pipeline state received from the device driver 103.

At step 1006, the pipeline state is updated in the constant buffer 906 based on the constant buffer update commands. At step 1008, a shader engine, such as shader engine 902(0), retrieves the pipeline state information stored in the constant buffer 906 via a load from the constant buffer.

Advantageously, the technique described herein allows shader engines executing within the graphics pipeline to access state information that was previously unavailable to shader engines. Further, the mechanism described for accessing the state information via the constant buffers does not require any hardware modifications for PPU 202 that support multiple versions of constants, and also does not require computationally intensive processing.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.h

We claim:

1. A computer-implemented method for providing state information to two or more shader engines within a processing pipeline, the method comprising:
storing first pipeline state information in a constant buffer that is coupled to, and concurrently accessible by, each of the two or more shader engines;
receiving second pipeline state information from an application;
copying the first pipeline state information in the constant buffer to a page pool, in response to receiving the second pipeline state information; and
updating the first pipeline state information stored in the constant buffer based on the second pipeline state information, in response to receiving the second pipeline state information,
wherein the updated first pipeline state information stored in the constant buffer and the first pipeline state information stored in the page pool are both concurrently accessible by each of the two or more shader engines, and
wherein the first pipeline state information includes a first version of a programmable constant and the second pipeline state information includes a second version of the programmable constant.

2. The method of claim 1, wherein a first shader engine executes a first data processing command to retrieve at least a portion of the first pipeline state information stored in the constant buffer.

3. The method of claim 2, wherein the second pipeline state information received from the application is included in a state object.

4. The method of claim 3, further comprising the step of generating one or more constant buffer update commands for unpacking the state object and updating the first pipeline state information stored in the constant buffer.

5. The method of claim 2, wherein the second pipeline state information received from the application is compressed.

6. The method of claim 5, further comprising the step of decompressing the second pipeline state information received from the application via one or more decompression macros stored in an instruction memory.

7. The method of claim 1, wherein the first pipeline state information stored in the constant buffer includes one or more parameters for performing blend operations on graphics data.

8. The method of claim 1, wherein the first pipeline state information stored in the constant buffer includes information associated with one or more render targets.

9. The method of claim 1, wherein the first pipeline state information stored in the constant buffer includes information associated with depth testing.

10. The method of claim 1, wherein the first pipeline state information stored in the constant buffer includes information associated with clipping.

11. The method of claim 1, wherein, prior to the step of updating, storing a current version of the first pipeline state information stored in the constant buffer in a different memory location.

12. The method of claim 1 wherein copying further comprises:

updating an address translation table for the page pool to correspond to the first pipeline state information stored in the constant buffer, wherein the address translation table entries correspond to page pool entries, wherein the page pool entries include all prior versions of pipeline state information stored in the constant buffer, and wherein the granularity of the address translation table matches the granularity of the constant buffer.

13. The method of claim 1 wherein updating further comprises:

loading constants into the constant buffer;

updating a constant buffer table entry, wherein the constant buffer table entry points to the constant buffer, and includes a reference count associated with the constant buffer, a version value associated with the constant buffer, and a processing flag associated with the constant buffer; and binding a slot in a slot table to the constant buffer, wherein an index corresponding to the constant buffer table entry is stored in the slot, and wherein the slot table can be specifically associated with one of the two or more shader engines.

14. A non-transitory computer-readable medium storing instructions that, when executed by a processor, causes the processor to provide state information to two or more shader engines within a processing pipeline, by performing the steps of:

storing first pipeline state information in a constant buffer that is coupled to, and concurrently accessible by, each of the two or more shader engines;

receiving second pipeline state information from an application;

copying the first pipeline state information in the constant buffer to a page pool, in response to receiving the second pipeline state information; and updating the first pipeline state information stored in the constant buffer based on the second pipeline state information, in response to receiving the second pipeline state information, wherein the updated first pipeline state information stored in the constant buffer and the first pipeline state information stored in the page pool are both concurrently accessible by each of the two or more shader engines, and wherein the first pipeline state information includes a first version of a programmable constant and the second pipeline state information includes a second version of the programmable constant.

15. The non-transitory computer-readable medium of claim 14, wherein a first shader engine executes a first data processing command to retrieve at least a portion of the first pipeline state information stored in the constant buffer.

16. The non-transitory computer-readable medium of claim 15, wherein the second pipeline state information received from the application is included in a state object.

17. The non-transitory computer-readable medium of claim 16, further comprising the step of generating one or more constant buffer update commands for unpacking the state object and updating the first pipeline state information stored in the constant buffer.

18. The non-transitory computer-readable medium of claim 15, wherein the second pipeline state information received from the application is compressed.

19. The non-transitory computer-readable medium of claim 18, further comprising the step of decompressing the second pipeline state information received from the application via one or more decompression macros stored in an instruction memory.

20. The non-transitory computer-readable medium of claim 14, wherein the first pipeline state information stored in the constant buffer includes one or more parameters for performing blend operations on graphics data.

21. The non-transitory computer-readable medium of claim 14, wherein the first pipeline state information stored in the constant buffer includes information associated with one or more render targets.

22. The non-transitory computer-readable medium of claim 14, wherein the first pipeline state information stored in the constant buffer includes information associated with depth testing.

23. The non-transitory computer-readable medium of claim 14, wherein the first pipeline state information stored in the constant buffer includes information associated with clipping.

24. A computer system, comprising:

a memory; and a processor configured to:

storing first pipeline state information in a constant buffer that is coupled to, and concurrently accessible by, each of the two or more shader engines;

receiving second pipeline state information from an application;

copying the first pipeline state information in the constant buffer to a page pool, in response to receiving the second pipeline state information; and updating the first pipeline state information stored in the constant buffer based on the second pipeline state information, in response to receiving the second pipeline state information, wherein the updated first pipeline state information stored in the constant buffer and the first pipeline state information stored in the page pool are both concurrently accessible by each of the two or more shader engines, and wherein the first pipeline state information includes a first version of a programmable constant and the second pipeline state information includes a second version of the programmable constant.

* * * * *